(No Model.)
C. A. HUSSEY.
ELECTRIC BATTERY.
No. 414,318. Patented Nov. 5, 1889.
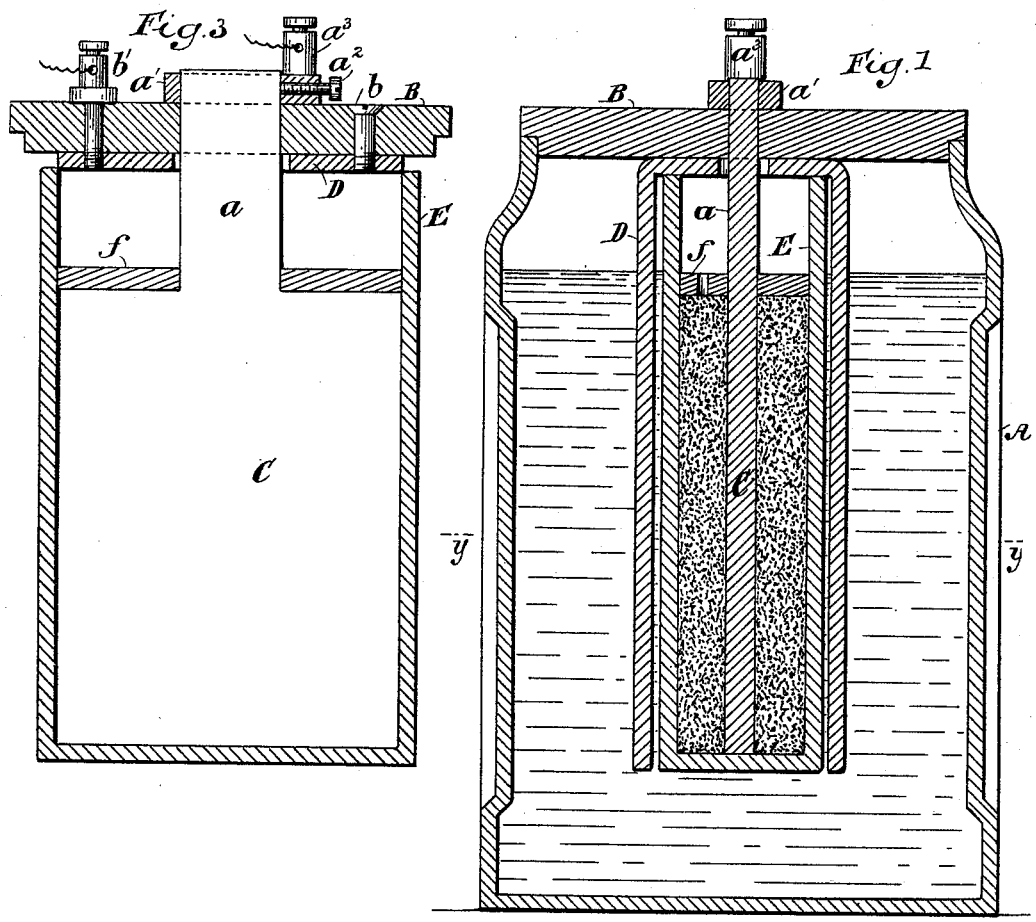
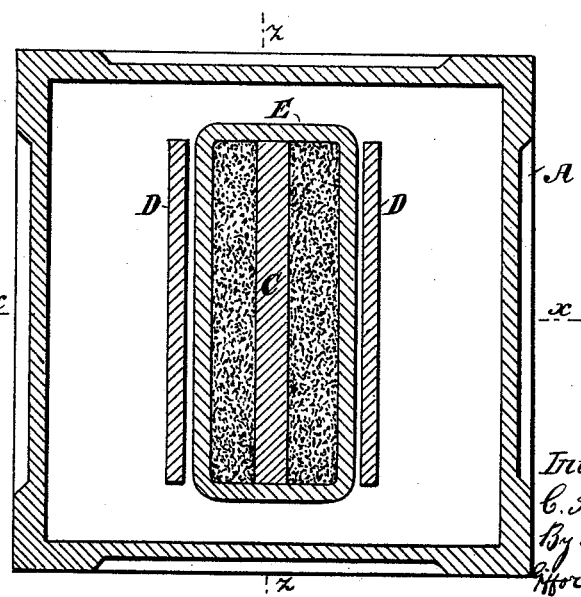

UNITED STATES PATENT OFFICE.

CHARLES A. HUSSEY, OF NEW YORK, N. Y.

ELECTRIC BATTERY.

SPECIFICATION forming part of Letters Patent No. 414,318, dated November 5, 1889.

Application filed February 9, 1889. Serial No. 299,282. (No model.)

*To all whom it may concern:*

Be it known that I, CHARLES A. HUSSEY, of New York, in the county and State of New York, have invented a new and useful Improvement in Electric Batteries, of which the following is a specification.

I will describe an electric battery embodying my improvement in detail, and then point out the novel features in claims.

In the accompanying drawings, Figure 1 is a vertical section of an electric battery embodying my improvement, taken on the plane of the dotted line $x\ x$, Fig. 2. Fig. 2 is a horizontal section of the same, taken on the plane of the line $y\ y$, Fig. 1. Fig. 3 is a vertical section of a porous cup and certain parts of the battery, taken on the plane of the line $z\ z$, Fig. 2.

Similar letters of reference designate corresponding parts in all the figures.

A designates the battery-cell. As shown, it is rectangular. It may be made of glass. The cell is provided with a cover B. I have illustrated a single flat carbon element comprising a main or body portion C and a shank portion $a$. The carbon is supported by the shank portion $a$, which extends through a suitable aperture in the cover and into a metal clamping-piece $a'$. A set-screw $a^2$ retains the shank of the carbon in the clamping-piece. Upon the clamping-piece is a binding-post $a^3$.

D designates a zinc element. (Shown as U-shaped.) The zinc is upheld by means of a screw $b$, extending through the cover B and engaging the zinc, and also by a binding-post $b'$, the screw-threaded shank of which also extends through the cover and engages the zinc.

E designates a porous cup. This cup is shown as rectangular and wider than it is thick. The porous cup, when in position, extends between the legs of the zinc element, while the carbon extends downwardly within the cup. In the cup I place powdered salts of bisulphate of mercury. The substance within the porous cup is in contact with the carbon element C.

When the battery is put in operation, water is supplied to the cell A and to the porous cup. I prefer to seal the top of the porous cup with a cover of wax or similar sealing material $f$. When this is used, I either leave an opening through the wax or puncture it to admit of introducing water into the cup. The wax by adhering to the carbon element and the porous cup serves to support the porous cup and its contents.

When a very low internal resistance is desired in the battery—as, for instance, when the battery is employed in connection with a motor, incandescent lamp, or analogous device—sulphuric acid may be added to the water in the cell A and cup E.

It will be understood from the foregoing description that the bisulphate of mercury intervenes between the positive and negative elements of the battery. Owing to this intervention of the bisulphate of mercury the sulphuric acid liberated in the action of the battery, owing to the decomposition of the bisulphate of mercury, permeates the porous cup and passes into the liquid outside of the porous cup and in the cell A.

The oxygen in the oxide of mercury produced by the decomposition of the bisulphate of mercury combines with the hydrogen, forming water. Metallic mercury is left. The arrangement of the bisulphate of mercury is such that the oxygen will be given off in such position as to intercept the hydrogen and prevent polarization.

By my improvement I succeed in making a battery energized by bisulphate of mercury, which will be a constant battery on a closed circuit, and which will at the same time be practically free from local action or polarization.

What I claim as my invention, and desire to secure by Letters Patent, is—

1. In an electric battery, the combination, with positive and negative elements, of powdered salts of bisulphate of mercury intervened between the positive and negative elements, substantially as specified.

2. In an electric battery, the combination, with positive and negative elements, of a porous cup into which the negative element extends, and powdered salts of bisulphate of mercury within the porous cup and intervened between the negative element and the porous cup, substantially as specified.

3. In an electric battery, the combination of a porous cup, a negative element extending into the same, powdered salts of bisulphate of mercury in the porous cup intervened between said cup and the negative element, and a seal or cover extending between the negative element and the porous cup above the powdered salts of bisulphate of mercury and provided with a perforation through it, substantially as specified.

CHARLES A. HUSSEY.

Witnesses:
C. R. FERGUSON,
WM. H. ROBINSON.